United States Patent
Boyd et al.

(10) Patent No.: US 8,768,988 B2
(45) Date of Patent: *Jul. 1, 2014

(54) ACCESSING SNAPSHOTS OF A TIME BASED FILE SYSTEM

(75) Inventors: Kenneth Wayne Boyd, Tucson, AZ (US); Kennth Fairclough Day, III, Tucson, AZ (US); Douglas William Dewey, Tucson, AZ (US); Christopher Diebold O'Toole, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,561

(22) Filed: Sep. 14, 2012

(65) Prior Publication Data

US 2013/0018931 A1    Jan. 17, 2013

Related U.S. Application Data

(63) Continuation of application No. 12/428,414, filed on Apr. 22, 2009, now Pat. No. 8,392,481.

(51) Int. Cl.
    *G06F 17/30*     (2006.01)
(52) U.S. Cl.
    USPC ......................................................... 707/831
(58) Field of Classification Search
    USPC ..................... 707/831, 999.106, 822, 828
    See application file for complete search history.

(56) References Cited

U.S. PATENT DOCUMENTS

| | | | |
|---|---|---|---|
| 5,537,636 A | 7/1996 | Uchide et al. | |
| 5,678,042 A | 10/1997 | Pisello et al. | |
| 5,819,292 A | 10/1998 | Hitz et al. | |
| 5,845,240 A | 12/1998 | Fielder | |
| 6,311,193 B1 | 10/2001 | Sekido | |
| 6,895,490 B1 | 5/2005 | Moore et al. | |
| 6,934,822 B2 | 8/2005 | Armangau et al. | |
| 7,051,050 B2 | 5/2006 | Chen et al. | |
| 7,373,364 B1 | 5/2008 | Chapman | |
| 7,567,985 B1 * | 7/2009 | Comay et al. | 707/999.2 |
| 7,979,401 B2 | 7/2011 | Beglin et al. | |
| 8,108,364 B2 | 1/2012 | Boyd et al. | |
| 2003/0182326 A1 | 9/2003 | Patterson | |

(Continued)

OTHER PUBLICATIONS

Notice of Allowance dated Aug. 17, 2012, pp. 1-16, for U.S. Appl. No. 12/428,414, filed Apr. 22, 2009, entitled "Accessing Snapshots of a Time Based File System" by inventors K.W. Boyd, K.F. Day, III, D.W. Dewey, and C.D. O'Toole.

(Continued)

*Primary Examiner* — Cam-Linh Nguyen

(74) *Attorney, Agent, or Firm* — Konrad Raynes Davda & Victor LLP; Rabindranath Dutta

(57) ABSTRACT

A file system driver stored in a computational device receives a request to provide access to a snapshot of a rewritable file system at a selected point in time, wherein a plurality of tokens corresponding to a plurality of data units are stored in the rewritable file system, and wherein an ordering relationship is maintained among the plurality of tokens. The file system driver determines a token corresponding to the selected point in time based on the ordering relationship. A virtual subdirectory name is generated corresponding to the determined token. A virtual subdirectory is created with the generated virtual subdirectory name, wherein the virtual subdirectory is a subdirectory of a root directory. The snapshot is accessed via the subdirectory.

15 Claims, 6 Drawing Sheets

(56) References Cited

U.S. PATENT DOCUMENTS

| | | | |
|---|---|---|---|
| 2004/0186858 | A1 | 9/2004 | McGovern et al. |
| 2004/0254936 | A1* | 12/2004 | Mohamed ................ 707/999.01 |
| 2005/0240636 | A1 | 10/2005 | Shitomi et al. |
| 2006/0047974 | A1* | 3/2006 | Alpern et al. ................ 713/191 |
| 2007/0088702 | A1* | 4/2007 | Fridella et al. ........... 707/999.01 |
| 2008/0046432 | A1 | 2/2008 | Anderson et al. |
| 2008/0059541 | A1 | 3/2008 | Fachan et al. |

OTHER PUBLICATIONS

L. Shrira, et al., "SNAP: Efficient Snapshots for Back-in-Time Execution", Proceedings of the 21st International Conference on Data Engineering, IEEE, 2005.

V. Gaburici, et al., "File System Support for Collaboration in the Wide Area", Proceedings of the 26th IEEE International Conference on Distributed Computing Systems, IEEE, 2006.

A. Brinkmann, et al., "Realizing Multilevel Snapshots in Dynamically Changing Virtualized Storage Environments", Proceedings of the International Conference on Networking, International Conference on Systems and International Conference on Mobile Communications and Learning Technologies, IEEE, 2006.

M.A. Olson, "The Design and Implementation of the Inversion File System", 1993 Winter USENIX—Jan. 25-29, 1993, San Diego, CA, pp. 1-14.

G. Russo et al., "An Operating System Independent WORM Archival System", Software-Practice and Experience, vol. 25(5), pp. 521-531, May 1995.

First Office Action dated Oct. 15, 2010, pp. 1-11, for U.S. Appl. No. 12/147,384, entitled "Time Based File System for Continuous Data Protection", by inventors T.W. Beglin, K.W. Boyd, K.F. Day III, and D.L. Chen.

Admendment dated Jan. 18, 2011, pp. 1-16, to First Office Action dated Oct. 15, 2010, pp. 1-11, U.S. Appl. No. 12/147,384, entitled "Time Based File System for Continuous Data Protection", by inventors T.W. Beglin, K.W. Boyd, K.F. Day III, and D.L. Chen.

Notice of Allowance dated Mar. 4, 2011, pp. 1-8, U.S. Appl. No. 12/147,384, entitled "Time Based File System for Continuous Data Protection", by inventors T.W. Beglin, K.W. Boyd, K.F. Day III, and D.L. Chen.

First Office Action dated Apr. 1, 2011, pp. 1-13, U.S. Appl. No. 12/428,414, entitled "Accessing Snapshots of a Time Based File System", by inventors K.W. Boyd, K.F. Day III, D.W. Dewey and C.D. O'Toole.

Response dated Jul. 1, 2011, pp. 1-13, to First Office Action dated Apr. 1, 2011, pp. 1-13, for U.S. Appl. No. 12/428,414, entitled "Accessing Snapshots of a Time Based File System", by inventors K.W. Boyd, K.F. Day III, D.W. Dewey and C.D. O'Toole.

Final Office Action dated Aug. 23, 2011, pp. 1-18, for U.S. Appl. No. 12/428,414, entitled "Accessing Snapshots of a Time Based File System", by inventors K.W. Boyd, K.F. Day III, D.W. Dewey and C.D. O'Toole.

Response dated Nov. 23, 2011, pp. 1-16, to Final Office Action dated Aug. 23, 2011, pp. 1-18, for U.S. Appl. No. 12/428,414, entitled "Accessing Snapshots of a Time Based File System", by inventors K.W. Boyd, K.F. Day III, D.W. Dewey and C.D. O'Toole.

Office Action dated Apr. 13, 2012, pp. 1-18, for U.S. Appl. No. 12/428,414, entitled "Accessing Snapshots of a Time Based File System", by inventors K.W. Boyd, K.F. Day III, D.W. Dewey and C.D. O'Toole.

Response dated Jul. 3, 2012, pp. 1-14, to Office Action dated Apr. 13, 2012, pp. 1-18, for U.S. Appl. No. 12/428,414, entitled "Accessing Snapshots of a Time Based File System", by inventors K.W. Boyd, K.F. Day III, D.W. Dewey and C.D. O'Toole.

Notice of Allowance dated Aug. 17, 2012, pp. 1-16, for U.S. Appl. No. 12/428,414, entitled "Accessing Snapshots of a Time Based File System", by inventors K.W. Boyd, K.F. Day III, D.W. Dewey and C.D. O'Toole.

* cited by examiner

ACCESSING SNAPSHOTS OF A TIME BASED FILE SYSTEM

CROSS-REFERENCE TO RELATED APPLICATIONS

This application is a continuation of application Ser. No. 12/428,414 filed on Apr. 22, 2009, which is incorporated herein by reference in its entirety.

BACKGROUND

1. Field

The disclosure relates to a method, system, and article of manufacture for accessing snapshots of a time based file system.

2. Background

In certain situations, it is useful to take "snapshot" copies of a file system at a plurality of points in time and subsequently restore the file system to a previously existing state after the file system has been altered. A snapshot copy may include all files that were present in the file system at the time the snapshot copy was taken. Therefore, a snapshot copy represents the state of the file system at the time the snapshot copy is taken.

The snapshot granularity, i.e., the temporal frequency with which the snapshot copies are taken, may be fixed and may be determined a priori. Commands for performing snapshot copies may be explicitly triggered or scheduled. Certain systems copy existing data to a new area on a disk before writing new data in the same place where the old data resided. This type of "copy-on-write" may impact performance of systems that store snapshot copies.

SUMMARY OF THE PREFERRED EMBODIMENTS

Provided are a method, system, and article of manufacture, wherein a file system driver stored in a computational device receives a request to provide access to a snapshot of a rewritable file system at a selected point in time, wherein a plurality of tokens corresponding to a plurality of data units are stored in the rewritable file system, and wherein an ordering relationship is maintained among the plurality of tokens. The file system driver determines a token corresponding to the selected point in time based on the ordering relationship. A virtual subdirectory name is generated corresponding to the determined token. A virtual subdirectory is created with the generated virtual subdirectory name, wherein the virtual subdirectory is a subdirectory of a root directory. The snapshot is accessed via the subdirectory.

In certain embodiments, the ordering relationship is such that a first token corresponding to a first data unit is of a lesser numerical value in comparison to a second token corresponding to a second data unit, and wherein the first data unit is written at an earlier point in time in comparison to the second data unit.

In further embodiments, a request is received to perform operations on the snapshot, wherein the request uses a file system interface. The request is interpreted and access is provided to the snapshot via the virtual subdirectory, wherein at least a pointer from the virtual subdirectory to the snapshot stored in the rewritable file system is used to access the snapshot.

In still further embodiments, the file system interface to access the snapshot is also used for accessing other files that are not stored by the rewritable file system, wherein no modifications are made within the file system driver to existing file system interfaces that are used by an operating system, and wherein the existing file system interfaces are also used to access other file systems in addition to being used to access the rewritable file system.

In additional embodiments, continuous data protection is provided by allowing the rewritable file system to be reverted to any prior point in time, wherein the determining, generating, creating, and accessing are performed by the file system driver, and wherein the file system driver comprises: a virtual subdirectory generator application that creates the virtual subdirectory; a virtual subdirectory accessor application that provides access to the snapshot; and a token to virtual subdirectory mapper data structure that maps tokens to virtual subdirectory names.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a mechanism by which the various snapshots may be accessed in a time based file system, via existing file system interfaces, so that operating system, browsers and other applications are not impacted. Users and applications are provided with a mechanism to access the time based file system data from any previous point in time without any modifications to the file system interfaces.

Figure 1:
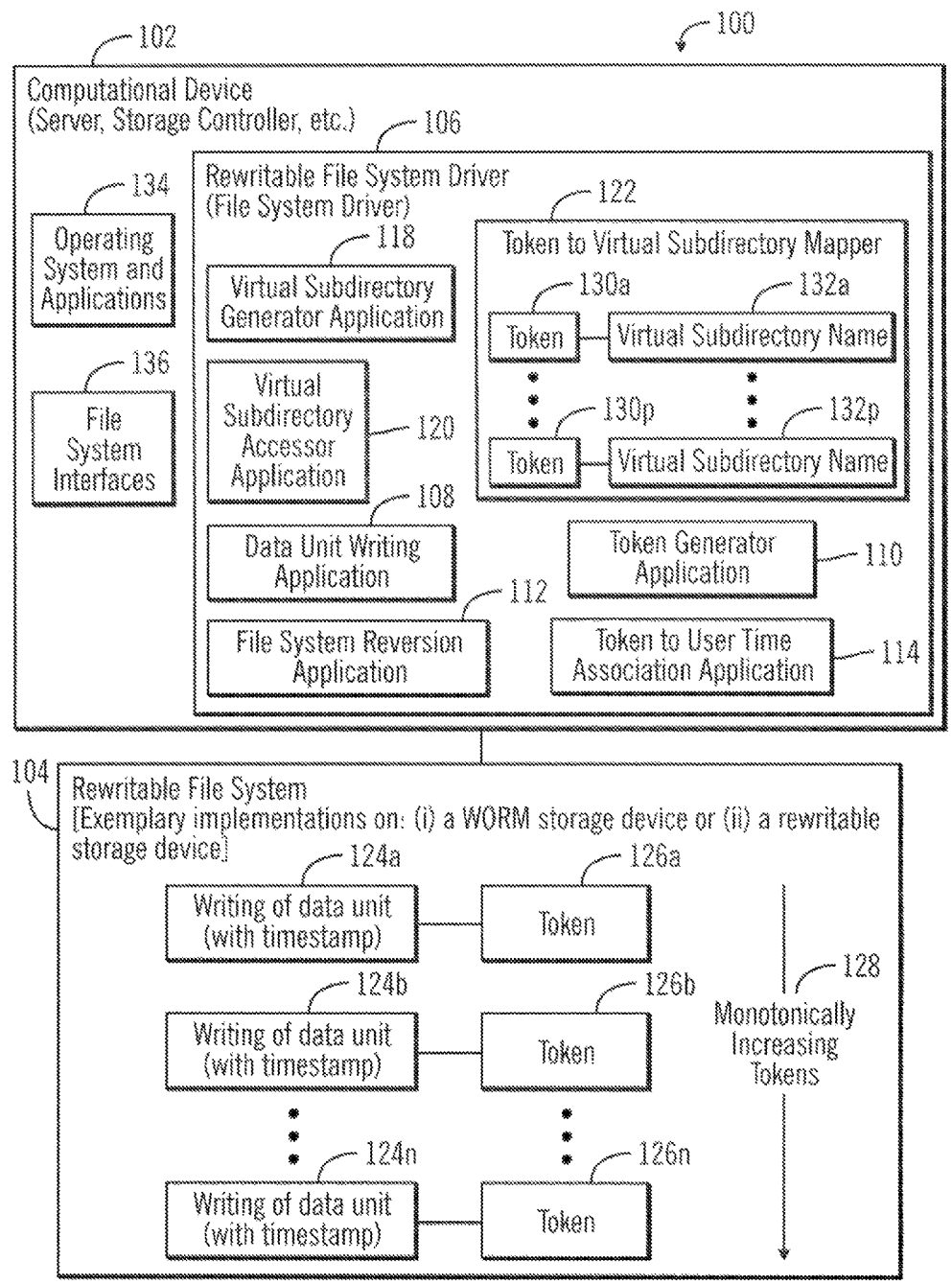
FIG. 1 illustrates a block diagram of a computing environment comprising a computational device and a rewritable file system in accordance with certain embodiments.

FIG. 1 illustrates a block diagram of a computing environment 100 comprising a computational device 102 and a rewritable file system 104 in accordance with certain embodiments. The computational device 102 may comprise any suitable computational platform, including those presently known in the art, such as, a server, a storage controller, a personal computer, a workstation, a mainframe, a midrange computer, a network appliance, a palm top computer, a telephony device, a blade computer, a hand held computer, etc. The rewritable file system 104 may comprise any suitable rewritable file system, i.e., a file system in which data can rewritten, wherein the rewritable file system 104 may be implemented on any rewritable storage device, such as a hard disk, a tape, flash memory, etc. In certain alternative embodiments, the rewritable file system 104 may be implemented on a Write Once Read Many (WORM) storage device.

The computational device 102 includes a rewritable file system driver 106 corresponding to the rewritable file system 104. The rewritable file system drive 106 is any suitable file system driver and may comprise a data unit writing application 108, a token generator application 110, a file system reversion application 112, and a token to user time association application 114, a virtual subdirectory generator application 118, a virtual subdirectory accessor application 120, and a token to subdirectory mapper data structure 122.

The data unit writing application 108 writes a plurality of data units 124a, 124b, . . . 124n to the rewritable file system 104, wherein timestamps that indicate the time at which a data unit is written may also be written in association with the data units 124a, 124b, . . . 124n. The token generator application 110 may generate tokens 126a, 126b, . . . , 126n that are in a monotonically increasing order as indicated by reference numeral 128. The token to user time association application 114 may associate the tokens 126a, 126b, . . . , 126n with the timestamps of the data units 124a, 124b, . . . , 124n. For example, token 126a may be associated with data unit 124a, token 126b may be associated with data unit 124b, and token 126n may be associated with data unit 124n.

The file system reversion application 112 reverts the rewritable file system 104 to an earlier point time in time.

The virtual subdirectory generator application 118 generates a virtual subdirectory of a root directory, wherein the virtual subdirectory is used by the virtual subdirectory accessor application 120 to provide access to snapshots that may be created in the rewritable file system 104. The virtual subdirectory generator application 118 may also generate and update a token to virtual subdirectory mapper 122 that maps exemplary tokens 130a . . . 130p to exemplary virtual subdirectory names 132a . . . 132p. Operating system and applications 134 that execute in the computational device 102 use existing file system interfaces 136 to access the snapshots provided by the rewritable file system 104.

Figure 2:
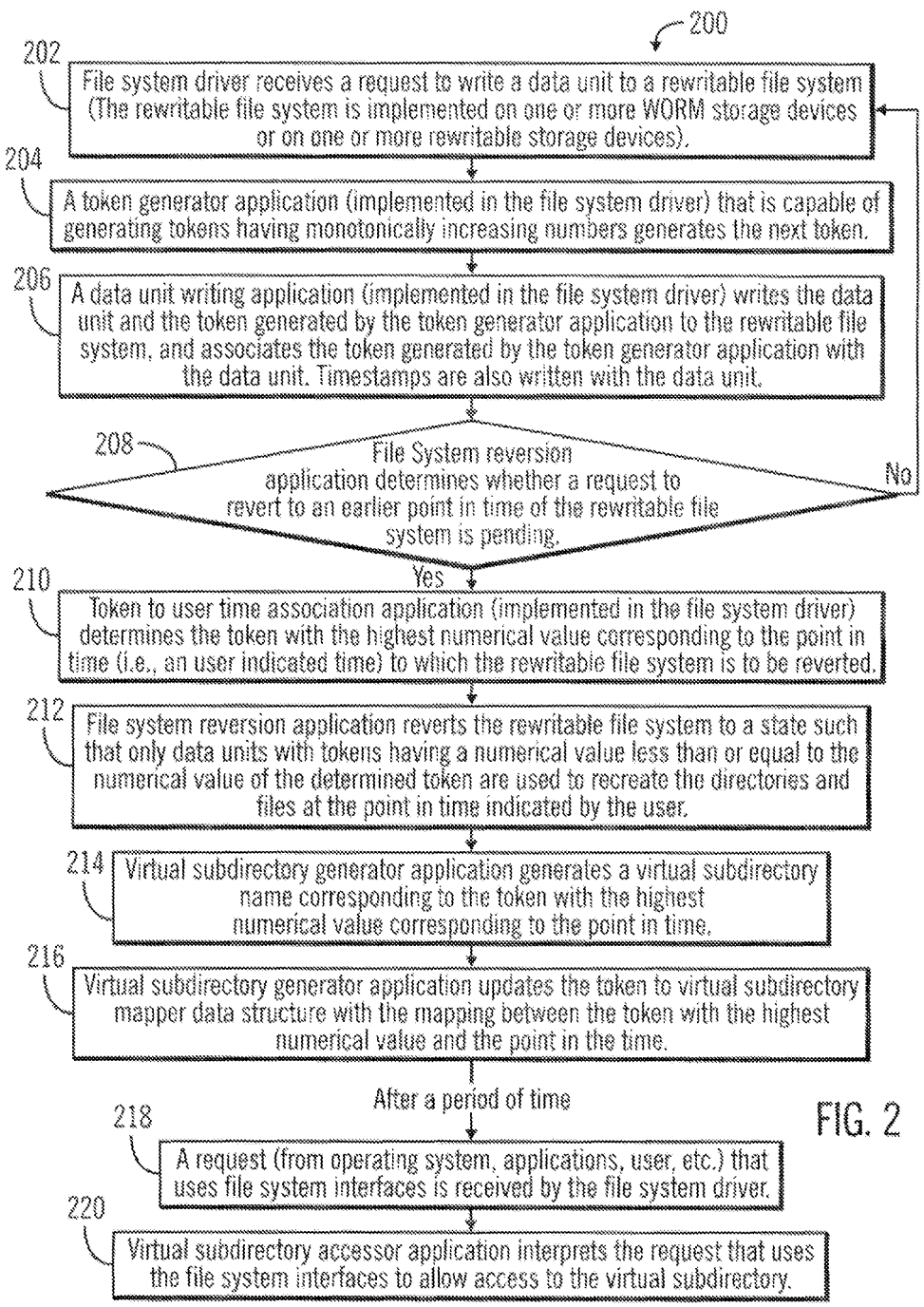
FIG. 2 illustrates first operations to access a rewritable file system, in accordance with certain embodiments.

FIG. 2 illustrates first operations 200 for accessing the rewritable file system 104, in accordance with certain embodiments. The first operations 200 may be implemented in the computational device 102.

Control starts at block 202, where the file system driver 106 receives a request to write a data unit to the rewritable file system 104. The data unit may comprise any unit of data, such as a byte, a record, a block, etc. The rewritable file system 104 is implemented on one or more Write Once Read Many (WORM) storage devices or on one or more rewritable storage devices.

Control proceeds to block 204, where the token generator application 110 (implemented in the file system driver 106) that is capable of generating tokens having monotonically increasing numbers generates the next token. The data unit writing application 108 (implemented in the file system driver 106) writes (at block 206) the data unit and the token generated by the token generator application 110 to the rewritable file system 104, and associates the token generated by the token generator application 110 with the data unit. Timestamps are also written with the data unit.

Control proceeds to block 208, where the file system reversion application 112 determines whether a request to revert to an earlier point in time of the rewritable file system is pending. If so, then the token to user time association application 114 (implemented in the file system driver 106) determines (at block 210) the token with the highest numerical value corresponding to the point in time to which the rewritable file system 104 is to be reverted. The point in time may be a user indicated time. The file system reversion application 112 reverts (at block 212) the rewritable file system 104 to a state such that only data units with tokens having a numerical value less than or equal to the numerical value of the determined token are used to recreate the directories and files at the point in time indicated by the user.

If at block 208, the file system reversion application 112 determines that a request to revert to an earlier point in time of the rewritable file system is not pending then control returns to block 202 where the file system driver 106 receives additional requests to write data units to the rewritable file system 104.

From block 212 control proceeds to block 214, where the virtual subdirectory generator application 118 generates a virtual subdirectory name corresponding to the token with the highest numerical value corresponding to the point in time. The virtual subdirectory generator application 118 updates (at block 216) the token to virtual subdirectory mapper data structure 122 with the mapping between the token with the highest numerical value and the point in time.

After the elapse of a period of time, a request from an operating system or an application 134 that uses the file system interfaces 136 is received (at block 218) by the file system driver 106. The virtual subdirectory accessor application 120 interprets the request that uses the file system interfaces and then provides access to the virtual subdirectory.

Therefore, FIG. 2 illustrates certain embodiments in which a rewritable file system that is a time based file system is accessed via a virtual subdirectory created by a virtual subdirectory generator application 118. The virtual subdirectory may be a subdirectory of a root directory. Operating system and applications may access the virtual subdirectory via existing files system interfaces, and as a result no changes are needed for existing file system interfaces.

Figure 3:
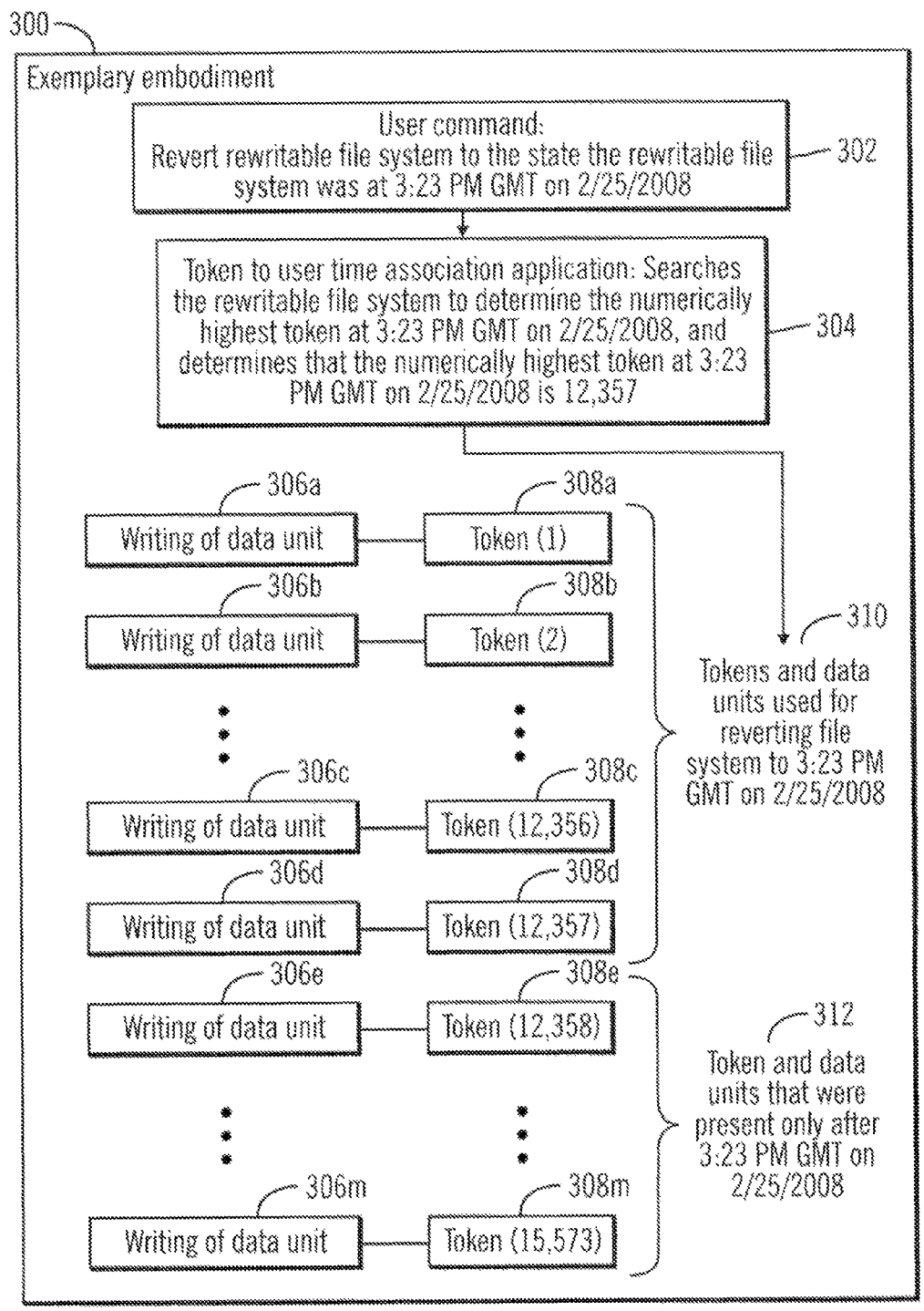
FIG. 3 illustrates a block diagram that shows how to revert a rewritable file system to the state the rewritable file system was at a selected time, in accordance with certain embodiments.

FIG. 3 a block diagram that shows how to revert an exemplary rewritable file system to the state the rewritable file system was at a selected time, in accordance with an exemplary embodiment 300.

A user command 302 may request reversion of the rewritable file system 104 to the state the rewritable file system 104 was at 3:23 PM GMT on Feb. 25, 2008. Block 304, shows that the token to user time association application 114 searches the rewritable file system 104 to determine the numerically highest token at 3:23 PM GMT on Feb. 25, 2008, and determines that the numerically highest token at 3:23 PM GMT on Feb. 25, 2008 is 12,357 (indicated by reference numeral 308d, wherein the data units 306a, 306b, . . . , 306c, 306d, 306e, . . . , 306m are associated with tokens 308a, 308b, . . . , 308c, 308d, 308e, . . . , 308m as shown in FIG. 3). FIG. 3 shows that token 308a has value 1, token 308b has value 2, token 308c has value 12,356, token 308d has value 12,357, token 308e has value 12,358 and token 308m has valued 15,573.

The file system reversion application 112 uses (reference numeral 310) the tokens 308a, 308b, . . . 308c,308d and data units 306a, 306b, . . . 306c, 306d for reverting the rewritable files system 104 to 3:23 PM GMT on Feb. 25, 2008. It can be seen from block 312 of FIG. 3 that tokens 308e . . . 308m and data units 306e . . . 306m were present only after 3:23 PM GMT on Feb. 25, 2008.

Therefore, FIG. 3 illustrates an exemplary embodiment in which a rewritable file system 104 is reverted to a state at a particular point in time by determining the numerically highest token at that particular point in time and using the determined token to revert the file system to the particular point in time.

Figure 4:
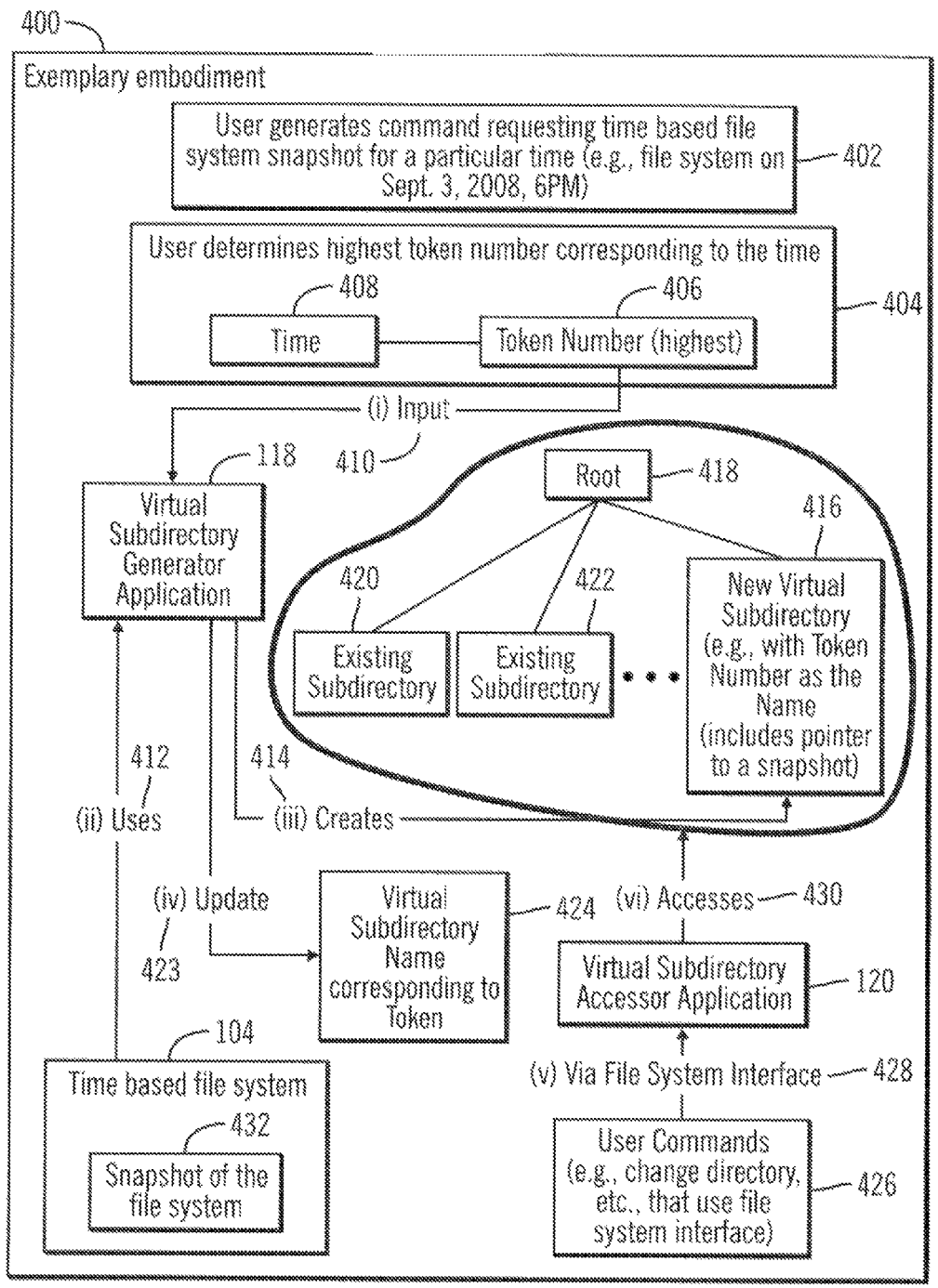
FIG. 4 illustrates a block diagram that shows how virtual subdirectories and created and accessed, in accordance with certain embodiments.

FIG. 4 illustrates a block diagram 400 that shows how virtual subdirectories and created and accessed, in accordance with certain embodiments. A user generates 402 a command requesting a time based file system snapshot for a particular time. The user may determine 404 the highest token 406 corresponding to the particular time 408. The virtual subdirectory generator application 118 uses the token 406 as input 410 and uses 412 the time based file system 104 (which is the same as the rewritable file system 104) to create 414 a new virtual subdirectory 416 which is a subdirectory of a root directory 418. The root directory 418 may have other existing subdirectories 420, 422. The virtual subdirectory generator application 118 also updates 423 the virtual subdirectory name 424 corresponding to the token 406.

The virtual subdirectory accessor application 120 receives user command 426 via file system interfaces 428 and accesses 430 the new virtual subdirectory 416 to provide access to the snapshot 432 of the file system corresponding to the token number 406.

Therefore, FIG. 4 illustrates certain embodiments for accessing a time based file system via subdirectories created from a root directory. No changes are needed for existing file system interfaces.

Figure 5:
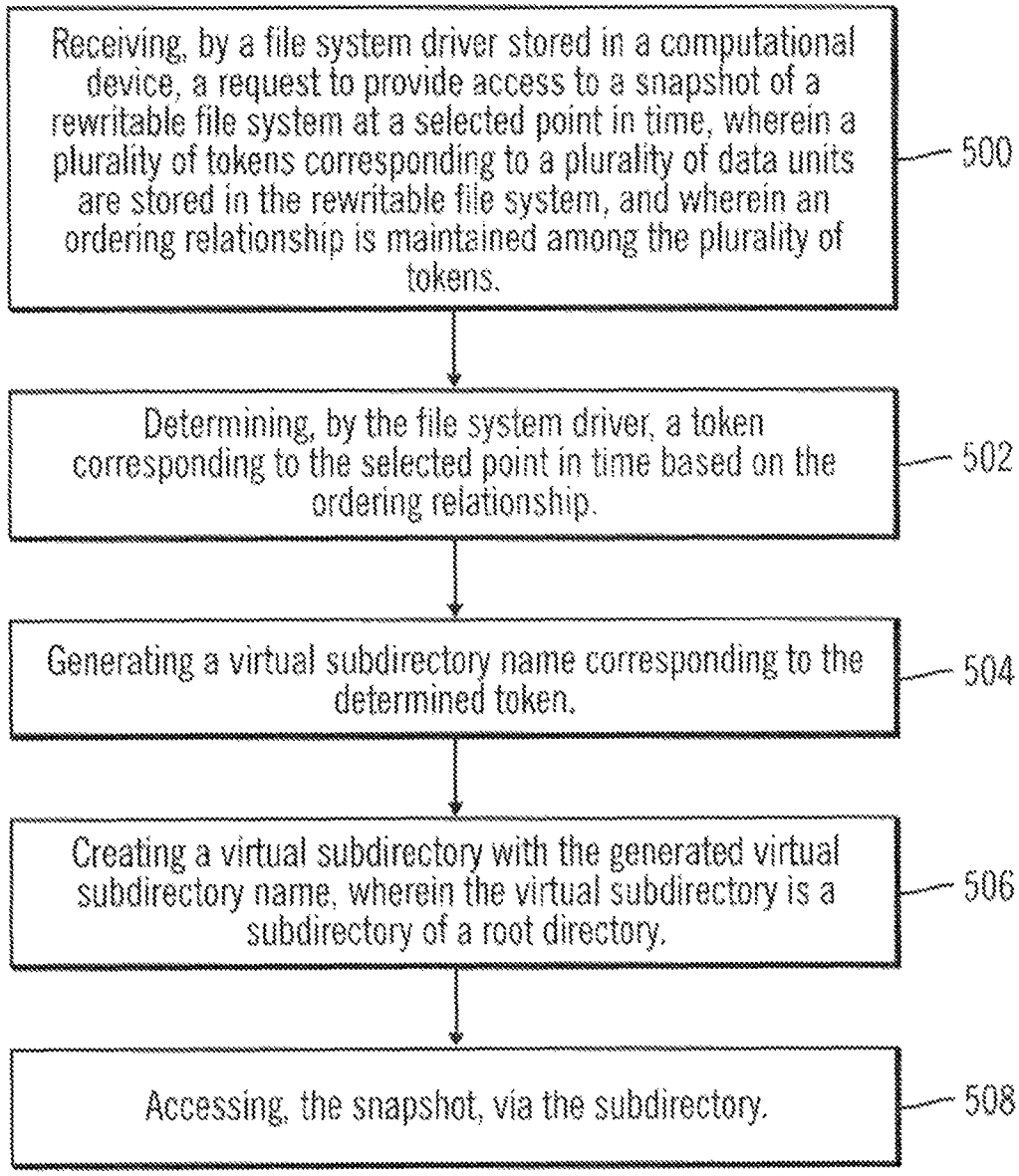
FIG. 5 illustrates second operations for accessing a rewritable file system to an earlier point in time, in accordance with certain embodiments.

FIG. 5 illustrates second operations for accessing a time based file system, in accordance with certain embodiments. The operations shown in FIG. 5 are implemented in the computational device 102.

Control starts at block 500 in which the file system driver 106 stored in the computational device 102 receives a request to provide access to a snapshot of a rewritable file system 104 at a selected point in time, wherein a plurality of tokens 126a . . . 126n corresponding to a plurality of data units 124a . . . 124n are stored in the rewritable file system 104, and wherein an ordering relationship is maintained among the plurality of tokens 126a . . . 126n. The file system driver 106 determines (at block 502) a token corresponding to the selected point in time based on the ordering relationship. Control proceeds to block 504 where the virtual subdirectory generator application 118 generates a virtual subdirectory name corresponding to the determined token.

The virtual subdirectory generator application 118 creates (at block 506) a virtual subdirectory 416 with the generated virtual subdirectory name, wherein the virtual subdirectory is a subdirectory of a root directory 418. Subsequently, a virtual subdirectory accessor application 120 accesses (at block 508) the snapshot, via the subdirectory.

Therefore FIG. 5 illustrates certain embodiments in which the a time based file system allows access to stored snapshots via a subdirectory of a root directory, such that no changes are needed for existing file system interfaces.

In certain embodiments, when a subdirectory is created by existing user interfaces the file system driver 106 is called with the name of the subdirectory and the parent directory. In certain embodiments, upon call the files system driver 106 performs a check that the parent directory is the root and the subdirectory name has a special prefix. If the name has the special prefix the file system driver 106 parses out the token value, and executes an internal mount code to setup structures in the mount control block or other tracking structures used for each mount instance. The token value is then added to the mount structure and the name of the subdirectory is also saved in the mount structure.

In certain other embodiments, upon call the file system driver 106 creates a directory entry for the subdirectory. Upon creation and assignment of an extended attribute to the subdirectory, the file system driver 106 checks for the special name of the extended attribute and if the special name is a specified key word value then the file system driver 106 checks that no files or subdirectories have been created under that subdirectory. Assuming none have been created, the file system driver 106 executes an internal mount code to setup structures in the mount control block or other tracking structures used for each mount instance When processing file name based requests and parsing the file name for regular file system semantic checking, the file system driver 106 checks for existence of the special subdirectory and if the special subdirectory exists then the file system driver 106 switches to using the mount instance created for the special directory rather than the one for the current file system instance.

In certain embodiments, upon subdirectory removal of one of these special subdirectories the file system driver 106 cleans up the structures built earlier.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment or an embodiment comprising hardware processing software elements. In certain embodiments, selected operations may be implemented in microcode that is present in one or more computational devices.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
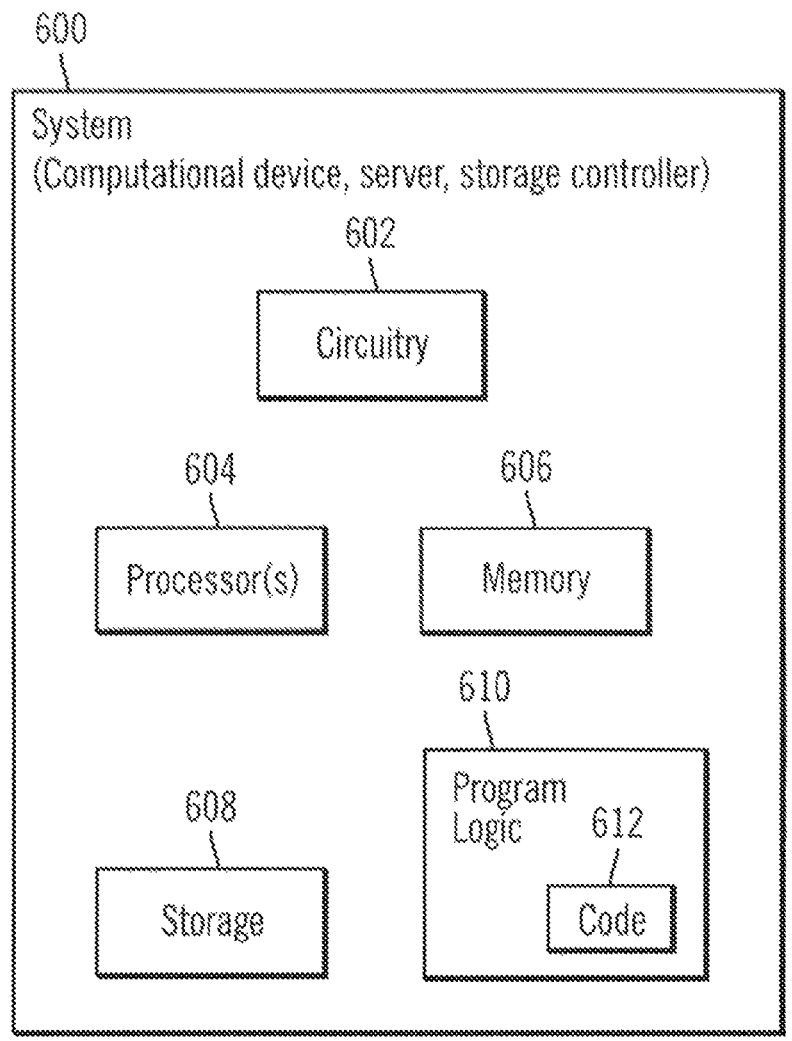
FIG. 6 illustrates a block diagram that shows certain elements that may be included in the computational device of the computing environment of FIG. 1, in accordance with certain embodiments.

FIG. 6 illustrates a block diagram that shows certain elements that may be included in the computational device 102 in accordance with certain embodiments. One or more of the computational devices 102 either individually or collectively may also be referred to as a system 600, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:
   receiving, by a file system driver stored in a computational device, a request to provide access to a snapshot of a file system at a selected point in time;
   receiving a request to perform operations on the snapshot, wherein the request uses a file system interface; and
   interpreting the request and providing access to the snapshot via a virtual subdirectory, wherein at least a pointer from the virtual subdirectory to the snapshot is used to access the snapshot, wherein the file system interface to access the snapshot is also used for accessing other files that are not stored by the file system, wherein no modifications are made within the file system driver to existing file system interfaces that are used by an operating system, wherein the existing file system interfaces are also used to access other file systems in addition to being used to access the file system, and wherein the method further comprises:
   generating a virtual subdirectory name corresponding to a token, wherein the token corresponds to the selected point in time;
   creating the virtual subdirectory with the generated virtual subdirectory name, wherein the virtual subdirectory is a subdirectory of a root directory;

determining whether the virtual subdirectory name has a special prefix; and in response to determining that the virtual subdirectory name has the special prefix, performing via a file system driver:

parsing a corresponding token value; and executing an internal mount code to create structures in a mount control block, in response to parsing the corresponding token value, wherein the corresponding token value is added to the structures in a mount control block, and wherein the virtual subdirectory name is saved in the structures in the mount control block.

2. The method of claim 1, wherein the file system is a rewritable file system.

3. The method of claim 2, wherein the file system interfaces are also used to access other file systems in addition to being used to access the rewritable file system.

4. The method of claim 3, wherein timestamps that indicate a chronological time at which a data unit is written is stored in the rewritable file system.

5. The method of claim 1, wherein in response to a call, the file system driver creates a directory entry for the subdirectory, and in response to a creation and assignment of an extended attribute to the subdirectory, the file system driver checks for a special name of the extended attribute and if the special name is a specified key word value then the file system driver checks to determine whether files or subdirectories have been created under that subdirectory, and in response to determining that no files or subdirectories have been created under the subdirectory, the file system driver executes the internal mount code to setup the structures in the mount control block.

6. A system, comprising:

a memory;

a processor coupled to the memory, wherein the processor performs operations, the operations comprising:

receiving, by a file system driver, a request to provide access to a snapshot of a file system at a selected point in time;

receiving a request to perform operations on the snapshot, wherein the request uses a file system interface; and interpreting the request and providing access to the snapshot via a virtual subdirectory, wherein at least a pointer from the virtual subdirectory to the snapshot is used to access the snapshot, wherein the file system interface to access the snapshot is also used for accessing other files that are not stored by the file system, wherein no modifications are made within the file system driver to existing file system interfaces that are used by an operating system, wherein the existing file system interfaces are also used to access other file systems in addition to being used to access the file system, and wherein the operations further comprise:

generating a virtual subdirectory name corresponding to a token, wherein the token corresponds to the selected point in time;

creating the virtual subdirectory with the generated virtual subdirectory name, wherein the virtual subdirectory is a subdirectory of a root directory;

determining whether the virtual subdirectory name has a special prefix; and in response to determining that the virtual subdirectory name has the special prefix, performing via a file system driver:

parsing a corresponding token value; and executing an internal mount code to create structures in a mount control block, in response to parsing the corresponding token value, wherein the corresponding token value is added to the structures in a mount control block, and wherein the virtual subdirectory name is saved in the structures in the mount control block.

7. The system of claim 6, wherein the file system is a rewritable file system.

8. The system of claim 7, wherein the file system interfaces are also used to access other file systems in addition to being used to access the rewritable file system.

9. The system of claim 8, wherein timestamps that indicate a chronological time at which a data unit is written is stored in the rewritable file system.

10. The system of claim 6, wherein in response to a call, the file system driver creates a directory entry for the subdirectory, and in response to a creation and assignment of an extended attribute to the subdirectory, the file system driver checks for a special name of the extended attribute and if the special name is a specified key word value then the file system driver checks to determine whether files or subdirectories have been created under that subdirectory, and in response to determining that no files or subdirectories have been created under the subdirectory, the file system driver executes the internal mount code to setup the structures in the mount control block.

11. A non-transitory computer readable storage medium, wherein code stored in the computer readable storage medium when executed by a computational device causes operations, the operations comprising:

receiving, by a file system driver stored in a computational device, a request to provide access to a snapshot of a file system at a selected point in time;

receiving a request to perform operations on the snapshot, wherein the request uses a file system interface; and interpreting the request and providing access to the snapshot via a virtual subdirectory, wherein at least a pointer from the virtual subdirectory to the snapshot is used to access the snapshot, wherein the file system interface to access the snapshot is also used for accessing other files that are not stored by the file system, wherein no modifications are made within the file system driver to existing file system interfaces that are used by an operating system, wherein the existing file system interfaces are also used to access other file systems in addition to being used to access the file system, and wherein the operations further comprise:

generating a virtual subdirectory name corresponding to a token, wherein the token corresponds to the selected point in time;

creating the virtual subdirectory with the generated virtual subdirectory name, wherein the virtual subdirectory is a subdirectory of a root directory;

determining whether the virtual subdirectory name has a special prefix; and in response to determining that the virtual subdirectory name has the special prefix, performing via a file system driver:

parsing a corresponding token value; and executing an internal mount code to create structures in a mount control block, in response to parsing the corresponding token value, wherein the corresponding token value is added to the structures in a mount control block, and wherein the virtual subdirectory name is saved in the structures in the mount control block.

12. The non-transitory computer readable storage medium of claim 11, wherein the file system is a rewritable file system.

13. The non-transitory computer readable storage medium of claim 12, wherein the file system interfaces are also used to access other file systems in addition to being used to access the rewritable file system.

14. The non-transitory computer readable storage medium of claim 13, wherein timestamps that indicate a chronological time at which a data unit is written is stored in the rewritable file system.

15. The non-transitory computer readable storage medium of claim 11, wherein in response to a call, the file system driver creates a directory entry for the subdirectory, and in response to a creation and assignment of an extended attribute to the subdirectory, the file system driver checks for a special name of the extended attribute and if the special name is a specified key word value then the file system driver checks to determine whether files or subdirectories have been created under that subdirectory, and in response to determining that no files or subdirectories have been created under the subdirectory, the file system driver executes the internal mount code to setup the structures in the mount control block.

* * * * *